United States Patent
Suyama

[19]

[11] Patent Number: 6,142,512
[45] Date of Patent: Nov. 7, 2000

[54] AIR BELT SYSTEM

[75] Inventor: Yoji Suyama, Shiga, Japan

[73] Assignee: Takata Corporation, Tokyo, Japan

[21] Appl. No.: 09/328,889

[22] Filed: Jun. 9, 1999

[30] Foreign Application Priority Data

Jun. 9, 1998 [JP] Japan .................................. 10-160775
Jun. 9, 1998 [JP] Japan .................................. 10-160776

[51] Int. Cl.[7] .................................................. B60R 21/18
[52] U.S. Cl. ............................................................ 280/733
[58] Field of Search ........................................... 280/733

[56] References Cited

U.S. PATENT DOCUMENTS

| | | | |
|---|---|---|---|
| 3,791,670 | 2/1974 | Lucore et al. | 280/733 |
| 3,801,156 | 4/1974 | Granig | 297/386 |
| 3,868,627 | 2/1975 | Lawwill | 280/733 |
| 3,929,348 | 12/1975 | Lawwill | 280/733 |
| 5,465,999 | 11/1995 | Tanaka et al. | 280/733 |
| 5,466,002 | 11/1995 | Tanaka et al. | 280/733 |
| 5,472,231 | 12/1995 | France | 280/733 |
| 5,642,902 | 7/1997 | France | 280/733 |

FOREIGN PATENT DOCUMENTS

| | | |
|---|---|---|
| 0 901 941 | 3/1999 | European Pat. Off. . |
| 5-85301 | 4/1993 | Japan . |
| 11-78775 | 3/1999 | Japan . |
| 2 694 529 | 2/1994 | Rep. of Korea . |

*Primary Examiner*—Kenneth R. Rice
*Attorney, Agent, or Firm*—Foley & Lardner

[57] ABSTRACT

In an air belt system, gas is introduced from the tongue to the buckle with reliability, the occurrence of an unusual noise is eliminated, and the entrance of foreign materials into the buckle is prevented. The piston 60 is pushed up by gas from the inflator 16 mounted in the buckle 12, the tip portion of the piston 60 enters in the duct 12 of the tongue, and the cover 66 is ripped to allow gas to be supplied into the duct 20. The piston 60 is provided with O-ring 72 which slides with respect to the inner surface of the piston holder 50 and comes in contact with the flange 52 of the piston holder 50.

7 Claims, 6 Drawing Sheets

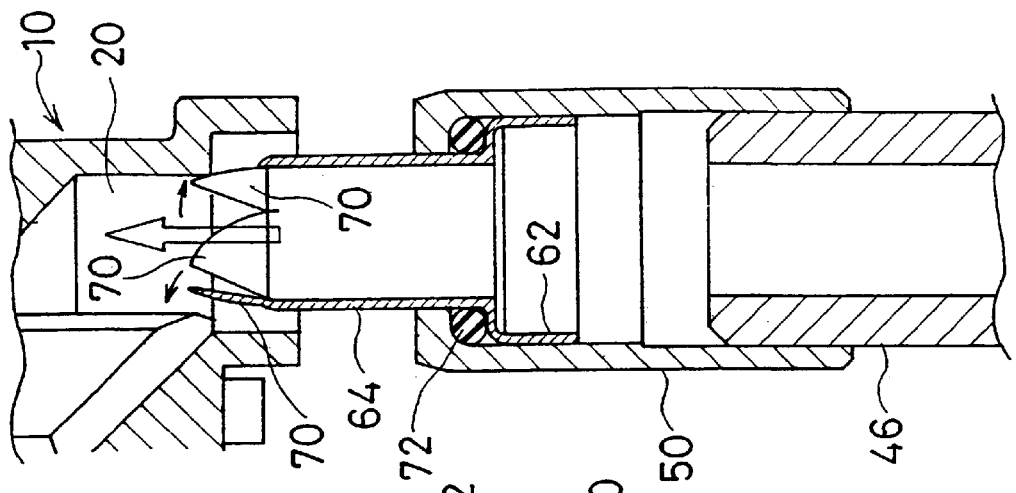
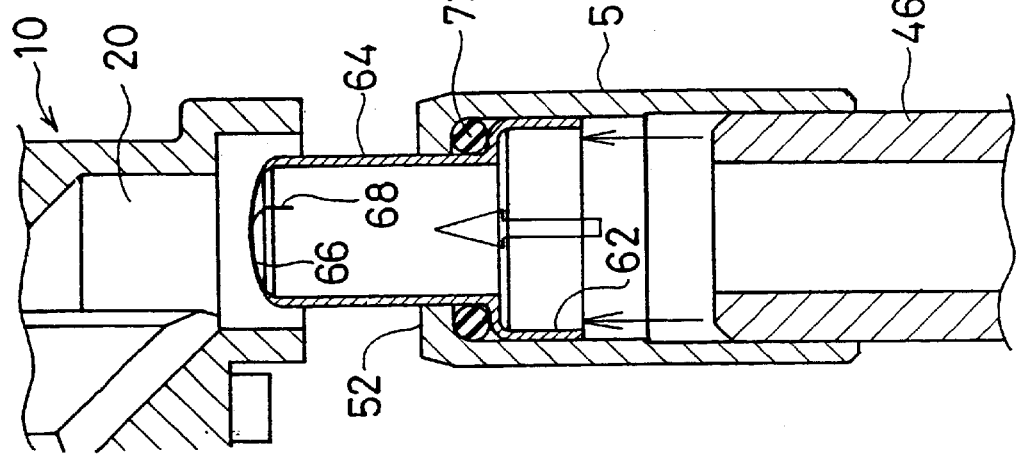
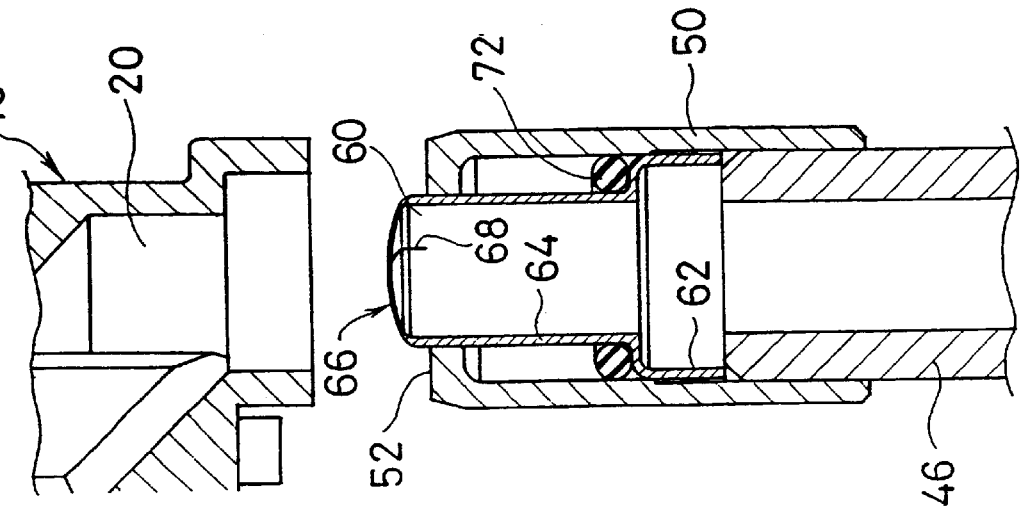

AIR BELT SYSTEM

FIELD OF THE INVENTION

The present invention relates to a seat belt system for protecting a passenger on a mobile unit including an automotive vehicle. More particularly, the present invention relates to an air belt system wherein a part of the seat belt is in a shape of an envelope and inflatable with gas from a gas generator. More particularly, the present invention relates to an air belt system wherein gases are supplied from a buckle through a tongue into the belt.

DESCRIPTION OF RELATED ART

FIG. 7a is a general perspective view of an air belt system disclosed in Japanese Patent Publication 5-85301A. FIG. 7b is a cross sectional view taken along the line B—B of FIG. 7a.

An air belt system 1 has a shoulder belt 2 extending diagonally across a passenger from a right side to a left side thereof, a lap belt 3 extending from the right side to the left side of the passenger, a buckle unit 4 disposed on a floor of a vehicle body or the like, a tongue 5 for being inserted into and engaged with the buckle unit 4 when the belt is to be fastened, and an intermediate guide 6 for guiding the shoulder belt 2.

The shoulder belt 2 comprises a normal belt 2a which is of the same material as that for generally used conventional seat belts and an inflatable belt 2b connected to one end of the normal belt 2a. The normal belt 2a is slidably drawn through the intermediate guide 6. The other end of the belt 2a is coupled to a seat belt retractor (ELR) 7 having a collision lock feature fixed to the vehicle body. The seat belt retractor 7 is adapted to wind up the normal belt 2a.

The belt 2b is so located as to be in contact with the passenger, and the tongue 5 is secured to the end thereof opposite the normal belt 2a.

The lap belt 3 is made of a normal webbing which is of the same material as generally used seat belts and coupled to the tongue 5 on one end and to a seat belt retractor (ELR) 8 fixed to the vehicle body on the other end. The buckle unit 4 further includes a gas generator 9 coupled thereto, which actuates and generates high pressure gas in case of emergency such as collisions.

The tongue 5 and the buckle unit 4 are provided with passages for allowing the gas to pass from the gas generator 9 to the inflatable belt 2b.

The inflatable belt 2b of the shoulder belt 2 is maintained in a shape of a webbing in normal state by folding a belt body 2c as shown in solid line in FIG. 7b and covered for example by a knitted fabric 2d and sewed on both sides thereof When the gas generator 9 is actuated, a sewed portion 2e of the knitted fabric 2d comes off with ease by the force of inflation of the shoulder belt 2 to allow the pouched belt 2b to inflate and deploy as shown in a phantom line.

OBJECT AND SUMMARY OF THE INVENTION

A first object of the present invention is to introduce gases surely from a gas passage of a buckle into a gas passage of a tongue of an air belt system.

A second object of the present invention is to provide the air belt system wherein an unusual noise generated when the automotive vehicle is subject to vibration or the like is reduced.

A third object of the present invention is to provide the air belt system wherein foreign materials are prevented from being introduced into the gas passage of the buckle.

The air belt system in the present invention has an air belt which inflates with gas introduced therein, a tongue connected to one end of said air belt, a buckle for being engaged with the tongue, gas passages provided in the buckle and in the tongue respectively, and a gas generator for supplying gas to the gas passage of the buckle. The buckle has a slidably mounted cylindrical piston having a gas passage therein and advancing by means of the pressure of gas. The tongue is provided with an opening where the piston is inserted when being advanced.

In the air belt system of the invention, actuation of the gas generator advances and inserts the piston into a duct of the buckle to allow gas from the piston to be introduced into the gas passage in the buckle.

According to an aspect of the present invention, the buckle may be provided with a cylindrical piston holder fitted around the piston, and the piston may be provided with a seal ring sliding with respect to the inner surface of the piston holder.

According to the aspect of the air belt system of the present invention, the seal ring prevents the gas leakage and noise generated when the piston hits against the piston holder.

In this aspect, it is preferable that the diameter of the piston is small in the front side and large in the back side to form a shoulder therebetween where the seal ring is seated, and on the tip portion of said piston holder, there an inwardly facing flange to stop the piston via seal ring on the large-diameter portion when the piston is advanced. The large-diameter portion of the piston hits against the flange via the seal ring, and consequently the noise occurred by such hits is reduced.

In the present invention, a cap which is opened by the pressure of the gas may be provided integrally on the tip of the piston. The tip portion of the piston is sealed with the cap even when the tongue is not engaged with the buckle so that foreign materials (such as dust or sand) cannot come into the gas passage in the piston or the buckle. The cap formed integrally with the piston prevents the cap from coming apart when the pressure of gas is introduced into the piston to ensure the advancement of the piston to the extremity. When the piston arrives at its extremity, a strong force caused by the pressure of gas is applied against the inner surface of the cap to release the cap.

It is preferable that the inner surface of the cap is provided with linear grooves which are to be ripped by the pressure of gas and divided into a plurality of flaps. The flaps on the cap generated by such rips prevent gas from leaking when gas flows from the piston to the gas passage in the tongue.

The cap is preferably doming out. The cap having such a configuration can hardly be deformed by the force applied from the outside.

BRIEF DESCRIPTION OF THE DRAWINGS

FIGS. 3a, 3b, and 3c are cross sectional views illustrating the coupling states of the buckle and the tongue in FIG. 1;

DETAILED DESCRIPTION OF PREFERRED EMBODIMENTS

Figure 1A:
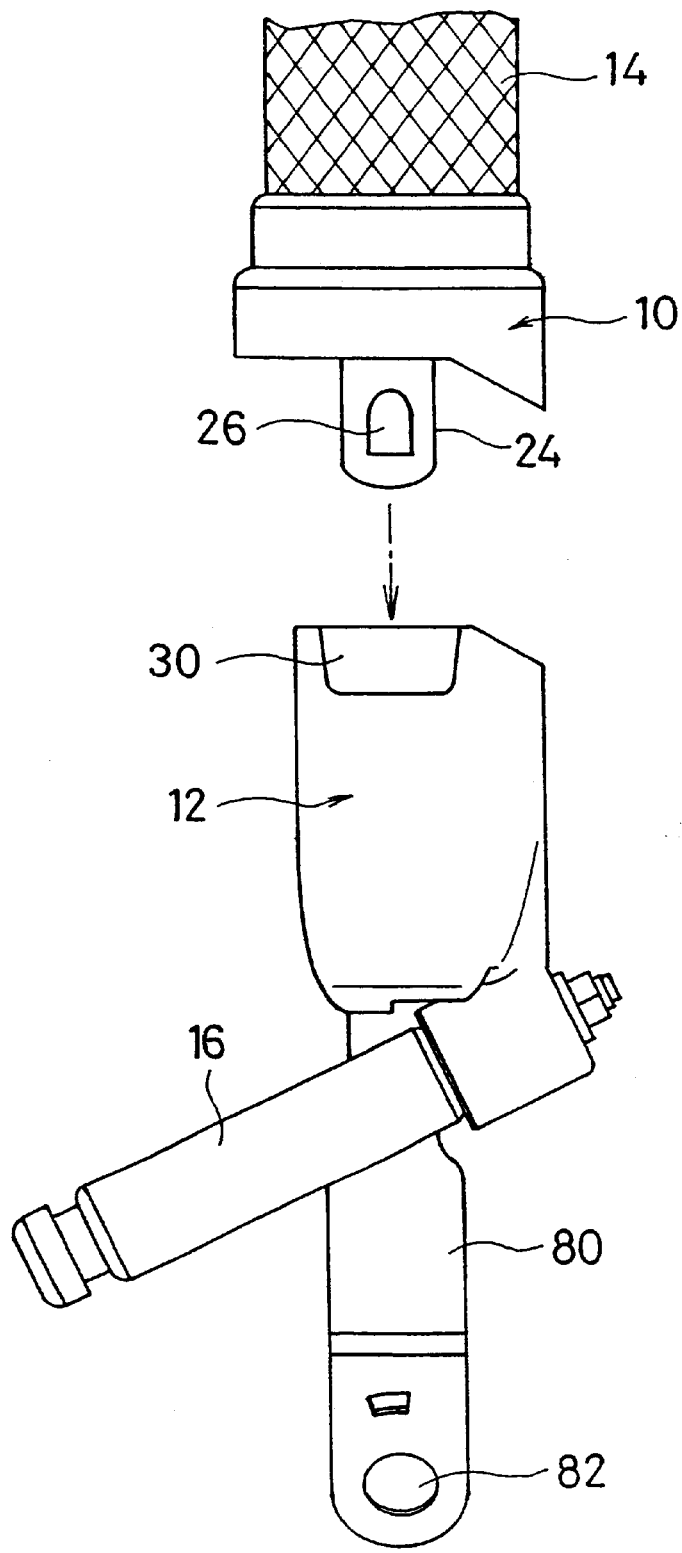
FIG. 1a is a front view illustrating a tongue and a buckle of the air belt system in an embodiment of this invention.
Figure 2:
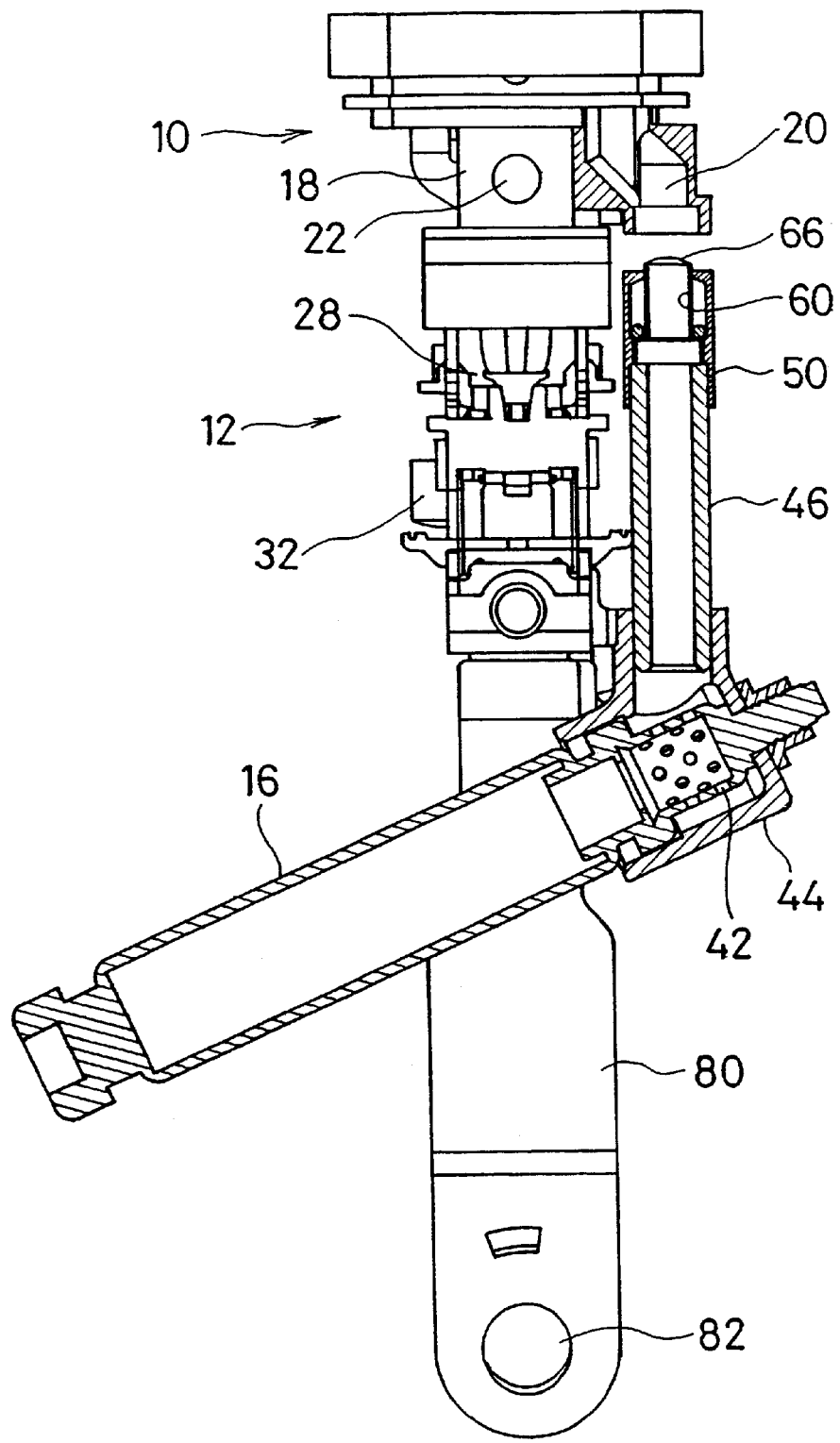
FIG. 2 is a constitutional view of buckle and the tongue in FIG. 1.
Figure 4A:
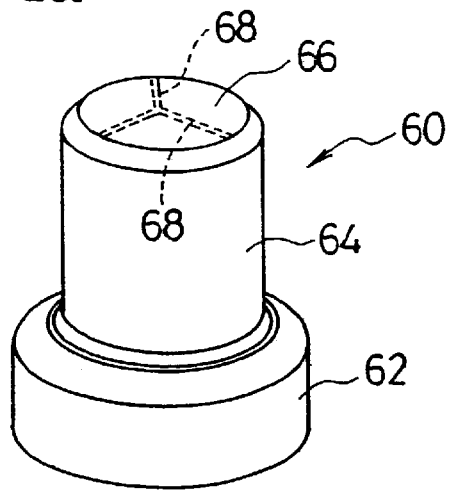
FIG. 4a is a perspective view of the piston.
Figure 4B:
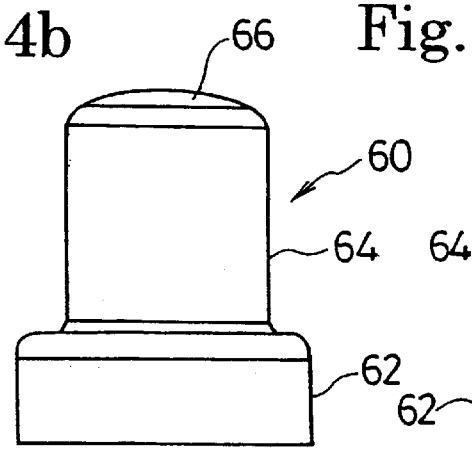
FIG. 4b is a side view of the piston.
Figure 4C:
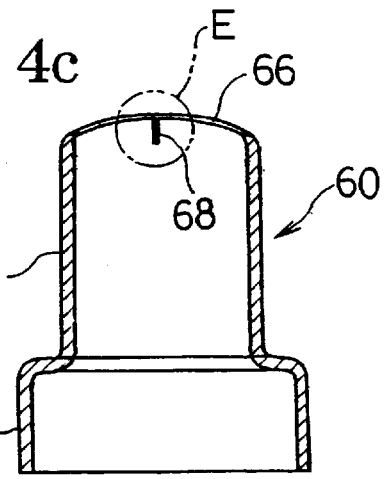
FIG. 4c is a cross sectional view of the piston.
Figure 4D:
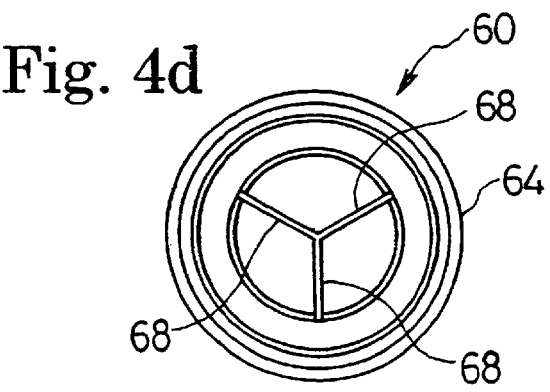
FIG. 4d is a bottom view of the piston and FIG. 4e is an enlarged view of the part E in FIG. 4c.
Figure 4E:
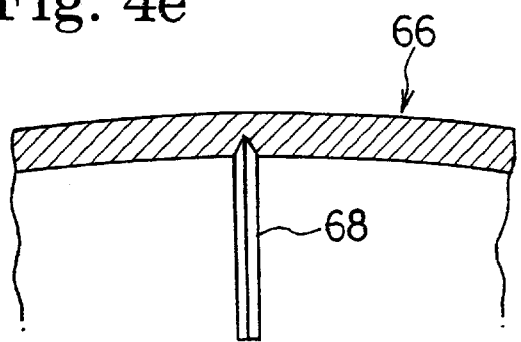

Referring to the drawings, embodiments of the present invention will be described in further detail. FIG. 1a is a front view illustrating a tongue and a buckle of an air belt system in an embodiment of this invention. FIG. 2 is a constitutional view of the buckle and tongue of this embodiment illustrating the state where they are engaged with each other and the outer shell is removed. FIG. 3 is a enlarged cross section of the tongue and buckle illustrating the coupled portion thereof. FIG. 4 illustrates the constitution of the piston.

The air belt system in the present invention has a tongue 10, a buckle 12 for receiving said tongue 10, and a gas generator (inflator) 16 or the like for supplying gas to said buckle 12. The tongue 10 has a tongue base 18 having a gas passage (duct) 20, a tongue plate 24 connected to the tongue base 18 with a connecting pin 22, and a lap belt anchor (not illustrated). The interior of the duct 20 is in communication with the interior of the air belt 14.

Figure 1B:
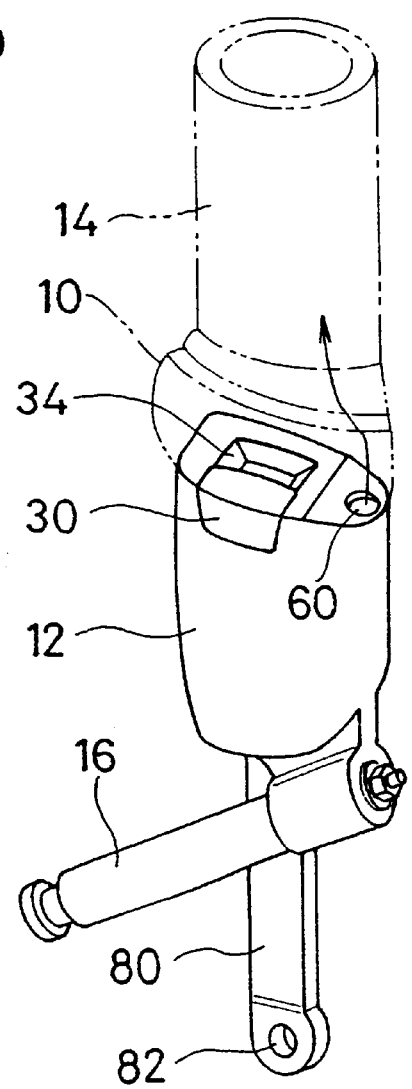
FIG. 1b is a perspective view of the buckle thereof.

The tongue plate 24 is inserted into the opening 34 (FIG. 1b) provided on the buckle 12, and latched with a latch lug formed on the latch mechanism 28 in the buckle 12 fitted into a latch aperture 26. By pressing down a press button 30 provided on the buckle 12, the latch is released and the tongue plate 24 is pressed out of the buckle 12 under action of the spring (not illustrated). Numeral 32 represents a tongue engagement sensing switch for sensing when the tongue plate 24 is inserted deeply enough into the buckle 12 and is engaged completely.

Figure 7A:
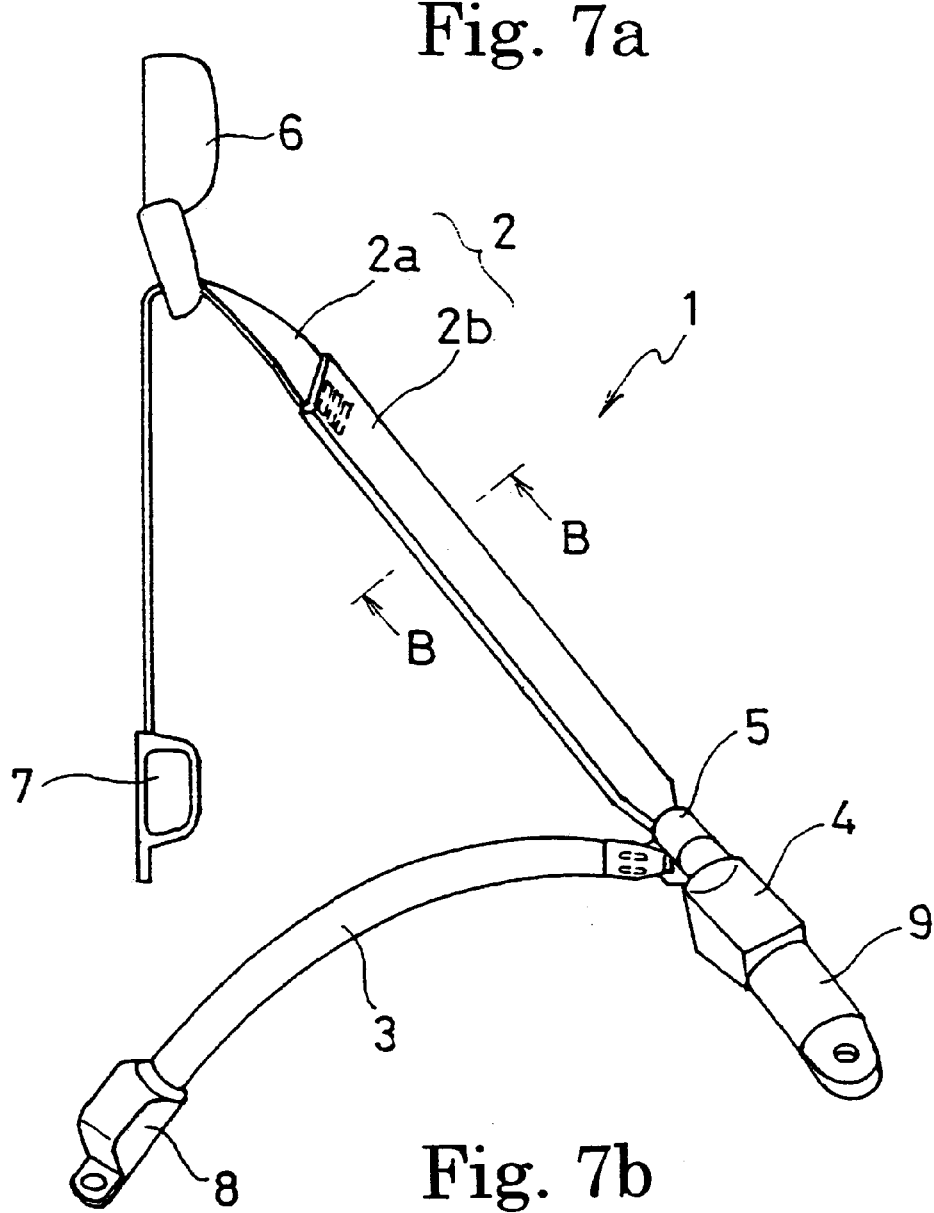
FIG. 7a is a general perspective view and FIG. 7b is a cross sectional view of an air belt in the related art.
Figure 7B:
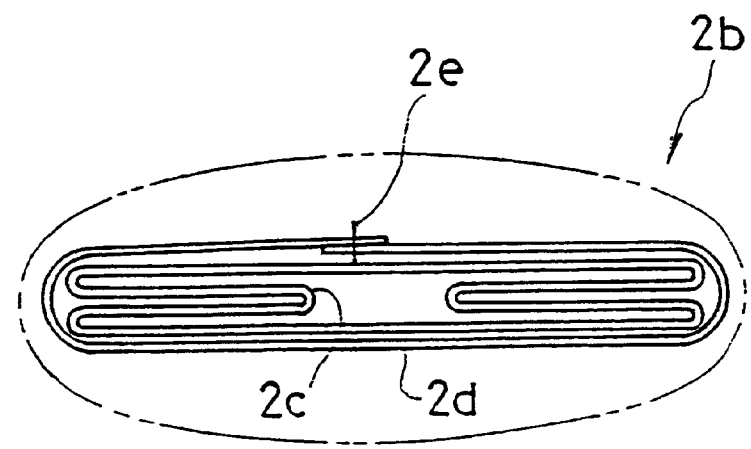

To the lap belt anchor, the tip portion of the lap belt is connected. The seat belt retractor is adapted to wind up the back end side of the lap belt as shown in FIG. 7.

In this embodiment, the air belt 14 constitutes a part of the shoulder belt, and the back end side of the air belt 14 is connected to the tip of the webbing constituting the shoulder belt, and the back end of the webbing can be retracted into the seat belt retractor for the shoulder belt.

On the tip surface of the buckle 12, there is provided an opening 34 for the tongue plate and a piston 60 projectably mounted thereon.

As shown in FIG. 2, a gas passage (duct) 46 made of a pipe is connected via an attachment 44 to a gas nozzle 42 on the tip of the inflator 16, and a base end of a piston holder 50 is fixed to the tip of the duct 46. The piston holder 50 is generally cylindrical and having an inwardly facing flange 52 on the tip end thereof.

The piston 60 is generally cylindrical and a back portion 62 thereof is large in diameter and a front portion 64 thereof is small in diameter. The small-diameter portion 64 is inserted through the flange 52 of the piston holder 50. The large-diameter portion 62 is so formed as to be too large in diameter to pass through the flange 52. The tip surface of the piston 60 is closed with the cover cap 66. On this cover cap 66, there are provided tear lines 68 (FIGS. 3a, 3b) formed of a shallow grooves, and when the pressure of gas is applied from the inflator 16, the cover cap 66 is ripped along the tear lines 68 and divided into a plurality of strips or flaps 70 (FIG. 3c).

In the present embodiments, tear lines 68 extend radially from the center of the cap 66 in three directions (allowing 120° distances in circumferential direction).

This cap 66 is formed for example, of aluminum, aluminum alloy, magnesium alloy, heat resistant synthetic resin, etc., in one piece with the piston 60 so that the cap 66 does not come apart from the piston 60 even when the pressure of gas is applied.

The cap 66 is outwardly doming out so as not to be deformed even when the force is applied from the outside.

On the small-diameter portion 64 of the piston 60 is fitted with an O-ring 72 as a seal ring. The O-ring 72 is disposed on the shoulder between the small-diameter portion 64 and the large diameter portion 62.

As shown in FIG. 2 and FIG. 3a, with the tongue 10 engaged within the buckle 12, the tip portion of the piston 60 is opposed to the entrance of the duct 20.

When the inflator 16 is actuated and the piston 60 is advanced to its extremity by the pressure of gas, the tip of the piston 60 is placed into the duct 20 as shown in FIG. 3b.

In the case where the cover cap 66 is ripped with the tip of the piston 60 inserted into the duct 20 as shown in FIG. 3c, the tips of generated flaps 70 enter into the duct 20.

A bracket 80 is projected downwardly from the buckle 12 so that it may be fixed to the member (not illustrated) of the vehicle body via a bolthole formed on the bracket 80.

In this arrangement of the air belt system, a tongue 10 is engaged with the buckle as shown in FIG. 2. In this case, the tongue plate 24 is inserted into the opening 34 and latched by the latch mechanism 28 as described above, and the tip of the piston 60 is opposed to the gas inlet port of the duct 20 as shown in FIG. 3a.

When the inflator (gas generator) 16 is actuated with the tongue engaged, gas is supplied through the duct 46 into the piston 60 to push the piston 60 up. The piston 60 advances until the large-diameter portion 62 touches via 0-ring 72 to the flange 52. The cover 66 is then ripped to allow gas to flow through the duct 20 into the air belt 14 to inflate the air belt 14.

In this embodiment, since the tips of the flaps 70 enter into the duct 20 as shown in FIG. 3c, and the space between the duct 20 and the piston 60 is surrounded by the flaps 70, gas may be supplied through the duct 20 to the air belt 14 with no or little leakage to the outside thereof.

In this embodiment, O-ring 72 fitted on the piston 60 is in elastic contact with the outer surface of the piston 60 and the inner surface of the piston holder so as to prevent gas leakage, as well as an unusual noise which may occur by the hitting of the piston 60 against the piston holder 50 even when the buckle 12 is subjected to vibration under the state shown in FIG. 2 and FIG. 3a.

When the piston 60 advances to its extremity and the large-diameter portion 62 hits against the flange 52 as shown in FIG. 2b, the shock caused by the hits of the large-diameter portion 62 against the flange 52 is eliminated due to the presence of the O-ring between the large diameter portion 62 and the flange 52 to prevent components from being damaged.

In the buckle 12 of this embodiment, when the tongue 10 is engaged, the exit of the piston is closed by the cover 66. Therefore the entrance of foreign materials into the piston 60 and the duct 46 is prevented. Since the entrance of foreign materials into the piston 60 and the duct 46 is prevented in this way, the entrance thereof with gas into the air belt 14 when the air belt system is actuated may also be prevented.

Figure 5:
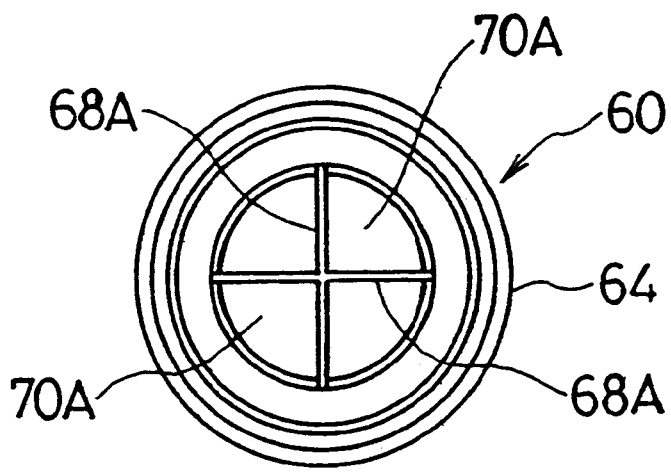
FIG. 5 is a bottom view of the piston in another configuration.
Figure 6:
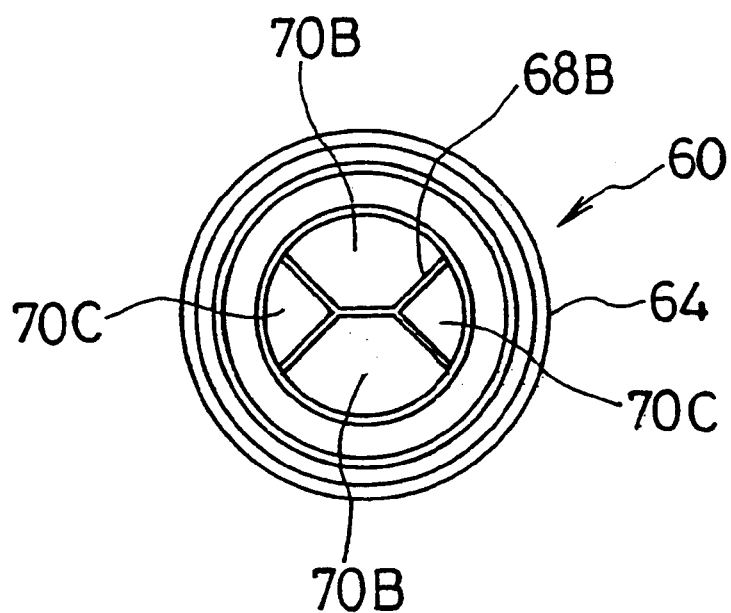
FIG. 6 is a bottom view of the piston in still another configuration.

In the embodiment described above, the tear lines extend radially from the center in three directions. However, they may extend in four directions as the tear lines 68A in FIG. 5, or may extend even in five directions. Though the tear lines 68 and 68A are arranged to form triangle flaps 70 and 70A in FIG. 4 and FIG. 5, the tear line 68B may be arranged so as to form a trapezoidal flaps 70B and 70B, and triangle flaps 70C and 70C.

As described hitherto, the present invention provides an air belt system which ensures gas flow from the buckle side to the tongue side, and prevents an unusual noise from occurring. In addition, the entrance of foreign materials into the gas passage on the buckle side or into the piston is prevented.

The priority documents Japanese H10-160775 and H10-160776 filed on Jun. 9, 1998, are hereby incorporated by reference. Copending U.S. patent application Ser. No. 09/145,277 is also incorporated by reference.

What is claimed is:

1. An air belt system comprising:

an air belt being inflatable by the introduction of gas, a tongue connected to one end of the air belt, a buckle to be engaged with the tongue, gas passages disposed in the buckle and the tongue respectively, and a gas generator for supplying gas to the gas passage of the buckle;

wherein the buckle is provided with a slidably mounted piston having a gas passage therein, and wherein the tongue is provided with an opening for receiving the piston when the piston is advanced.

2. An air belt system according to claim 1, wherein the buckle is provided with a piston holder fitted around the piston, and the piston is provided with a seal ring being slidable with respect to the inner surface of the piston holder.

3. An air belt system according to claim 2, wherein the front portion of the piston is small in diameter, the back portion of the piston is large in diameter, a shoulder is formed between the small-diameter portion and the large-diameter portion, and the seal ring is seated on the shoulder; and wherein the piston holder is provided with an inwardly facing flange so that the piston is stopped by the flange via the seal ring on the large-diameter portion of the piston when the piston is advanced.

4. An air belt system according to claim 1, wherein a cap which is opened by the pressure of gas when gas is injected is provided integrally on a tip portion of the piston.

5. An air belt system according to claim 4, wherein the inner surface of the cap is provided with linear grooves which are ripped by the pressure of gas to divide the cap into a plurality of flaps.

6. An air belt system according to claim 4, wherein the cap is outwardly domed out.

7. An air belt system according to claim 5, wherein the cap is outwardly domed out.

* * * * *